(12) United States Patent
Nagai

(10) Patent No.: US 6,328,369 B1
(45) Date of Patent: Dec. 11, 2001

(54) AUTOMOBILE

(75) Inventor: Shinichi Nagai, Hirakata (JP)

(73) Assignee: Yugenkaisha Paramount Corporation, Osaka (JP)

( * ) Notice: Subject to any disclaimer, the term of this patent is extended or adjusted under 35 U.S.C. 154(b) by 0 days.

(21) Appl. No.: 09/601,627

(22) PCT Filed: Dec. 28, 1999

(86) PCT No.: PCT/JP99/07369

§ 371 Date: Aug. 4, 2000

§ 102(e) Date: Aug. 4, 2000

(87) PCT Pub. No.: WO01/03993

PCT Pub. Date: Jan. 18, 2001

(51) Int. Cl.[7] .................................................. B62D 25/06
(52) U.S. Cl. ................................ 296/95.1; 160/DIG. 3; 160/370.21; 454/137; 296/185; 296/210
(58) Field of Search .............................. 296/97.1, 97.5, 296/95.1, 99.1, 208, 210, 185; 160/DIG. 3, 370.21; 454/136, 137, 138

(56) References Cited

U.S. PATENT DOCUMENTS

| | | | |
|---|---|---|---|
| 2,625,425 | * | 1/1953 | Foster . |
| 2,643,910 | * | 6/1953 | Lyon . |
| 2,643,912 | * | 6/1953 | Lyon . |
| 4,099,313 | * | 7/1978 | Phillips ........................ 296/197 X |
| 4,807,523 | * | 2/1989 | Radtke et al. . |
| 5,129,699 | * | 7/1992 | De Angeli ...................... 296/180.1 |
| 5,429,405 | * | 7/1995 | Newbould ....................... 296/95.1 |
| 5,544,929 | * | 8/1996 | Nagai ............................. 296/99.1 |

* cited by examiner

*Primary Examiner*—Joseph D. Pape
(74) *Attorney, Agent, or Firm*—Armstrong, Westerman, Hattori, McLeland & Naughton, LLP

(57) ABSTRACT

An automobile in which an external appearance of a body of the automobile is formed to assume substantially identically shaped front and rear portions, and in which visors are provided at a front head portion and a rear head portion of a roof of the body. There is obtained an automobile of high utility value capable of decreasing manufacturing costs through rationalization of manufacturing operations, and of securing safety during driving and comfort within the automobile.

4 Claims, 2 Drawing Sheets

AUTOMOBILE

TECHNICAL FIELD

The present invention relates to an automobile. More particularly, it relates to an automobile capable of decreasing manufacturing costs by rationalization of manufacturing operations, of securing safety during driving and comfort in the automobile, and further of prohibiting intrusions or mischief from the exterior.

BACKGROUND ART

An external appearance of a conventional automobile is so arranged that shapes of its front portion and rear portion are unsymmetrical. That is, a bonnet for an engine portion located in the front is arranged to be wide in order to contain an engine or interior parts of an air conditioning device or the like, and a trunk for a luggage-containing portion located in the rear, which serves as a portion for containing tools or the like, is arranged to be narrower than the front.

Due to this fact, respective automobile manufacturers are required to manufacture different shapes for each front and rear portion including designs for the front and rear portions of automobiles. Accordingly, operations during assembly processes are apt to become complicated which lead to increase in manufacturing costs.

Further, when driving an automobile during times zones in the morning and late afternoon at which the sun is located at low heights, a driver's body or face is exposed to direct rays of the sun irradiated from the front or the back to dazzle the driver with the result that objects such as marks or obstacles located in the periphery of the automobile might not be visually recognized or also that the driver might become sunstroke.

Further, when performing ventilation of the interior of the automobile, door windows are opened during driving or during halting such that stale air within the automobile is exhausted and fresh air from outside of the automobile is introduced into the automobile. However, such methods are not preferable in view of safety and sanitation since sand or gravels might enter the automobile during driving.

The present invention has been made in view of the above facts, and it is an object of the present invention to provide an automobile of extremely high utility value capable of decreasing manufacturing costs through rationalization of manufacturing operations, of securing safety during driving and comfort in the automobile through newly applied functions of front and rear visors, and of prohibiting intrusions from the exterior such that children might safely rest.

DISCLOSURE OF THE INVENTION

The automobile according to the present invention is so arranged that an external appearance of its body is formed to assume substantially identically shaped front and rear portions, and that a front visor extruding to the front from a front head portion of a roof of the body as well as a rear visor extruding to the rear from a rear head portion of the roof of the body are provided.

The automobile according to the present invention is preferably so arranged that an air suction inlet with a filter for introducing external air into the automobile is formed at least at a part of the front visor, and that an exhaust outlet for discharging air within the automobile to the exterior is formed at least at a part of the rear visor.

The automobile according to the present invention is preferably provided with an illuminating means proximate to a tip end of the front visor.

Further, the automobile according to the present invention is preferably provided with a television camera proximate to a tip end of the rear visor and with a display device for outputting image information which has been input to the television camera provided at a suitable position of a dashboard in the automobile.

BEST MODE FOR CARRYING OUT THE INVENTION

The automobile according to the present invention will now be explain ed with reference to the accompanying drawings.

A front portion of the automobile according to the present invention includes a bonnet and front fenders proximate to the bonnet for an engine portion, and a front windshield portion, and a rear portion of the automobile includes a trunk and rear fenders proximate to the trunk for a luggage-containing portion, and a rear windshield portion.

Figure 1:
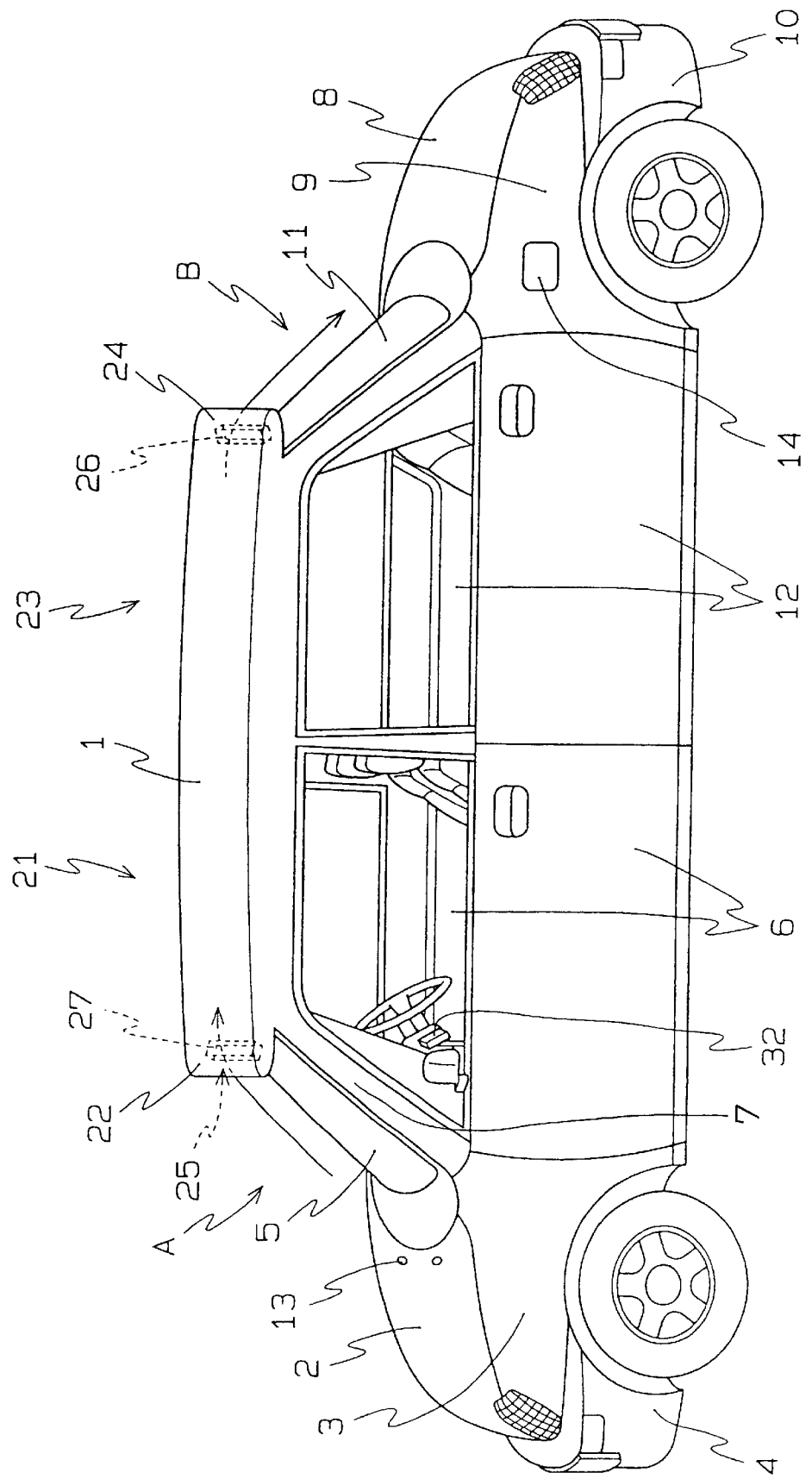
FIG. 1 is a side perspective view showing one embodiment of an automobile according to the present invention.

As illustrated in FIG. 1, the automobile according to one embodiment of the present invention is so arranged that the external appearances (shapes) of a front portion A and a rear portion B extending from the roof 1 assume substantially identical shapes. To the front portion A of a body, there are disposed a bonnet 2 and front fenders 3 for an engine portion, a bumper 4, a front windshield window 5, front doors 6 and a side frame 7 extending from the front portion A to the rear portion B; and to the rear portion B, there are disposed a trunk 8 and rear fenders 9 for a luggage-containing portion, a bumper 10, a rear windshield window 11 and rear doors 12.

The bonnet 2 and the trunk 8 as well as the front fenders 3 and the rear fenders 9 are respectively formed to assume identical shapes through identical die molding (press) whereupon a washer nozzle 13 is formed at a part of the bonnet 2 and a fuel inlet 14 is formed at either one of the two rear fenders 9.

An upper portion of the body assumes a shape in which the roof 1 of the body is extruding slightly upward, in which a front visor 22 is extruding forward from a front head portion 21 and in which a rear visor 24 is extruding rearward from a rear head portion 23. The front visor 22 and the rear visor 24 are streamlined members respectively made of steel plates or the like having lengths of approximately 150 to 300 mm.

In the illustrated embodiment, owing to the fact that the bonnet and the trunk assume substantially identical shapes, it is enabled to cut costs involved in the die molding to approximately half, to simplify assembling processes, to rationalize operations and simultaneously to decrease manufacturing costs. Moreover, it is possible to achieve an individual and unique external appearance and to realize a residing space with sufficient room both at front seats as well as rear seats.

Further, since the front visor 22 and rear visor 24 serve as shades in front and rear directions of the body in the illustrated embodiment, it is possible to protect the driver from being exposed to direct sun rays for most of the time in which the sun shines throughout the whole year. Accordingly, it is possible to secure favorable sight by preventing a driver's face from being exposed to direct sun rays and to ease fatigue of the driver by preventing a driver's back from being exposed to direct sun rays. With this arrangement, even taxi drivers who stay in the automobile for a long time will not get tired so that the driver's health might be protected.

Moreover, the illustrated embodiment is so arranged, as illustrated in FIG. 1, that an air suction inlet 25 for introducing external air into the automobile is formed at a lower surface side of the front visor 22 and an exhaust outlet 26 for discharging air within the automobile to the exterior is formed at a lower surface side of the rear visor 24. Further, owing to the fact that a filter 27 is attached at least at the air suction inlet 25, there can be prevented that dust included in the external air is introduced into the automobile.

By the provision of the air suction inlet 25 and the exhaust outlet 26, it is made possible to introduce fresh air from the exterior into the automobile through the air suction inlet 25 at the side of the front visor 22 and to exhaust stale air within the automobile through the exhaust outlet 26 at the side of the rear visor 24. Thus, the interior of the automobile might be maintained to be a favorable environment so that it is good for the health of the driver or any person sharing the automobile. Moreover, by maintaining the air suction inlet 25 or the exhaust outlet 26 open also during halting, purified external air is made to flow through the automobile even if the windows are closed and thereby one might feel at ease immediately after riding the automobile.

It should be noted that the air suction inlet 25 and the exhaust outlet 26 might comprise, for instance, a plurality of small pores and that it is possible to provide shutters (not shown) for adjusting flow rates.

Figure 2:
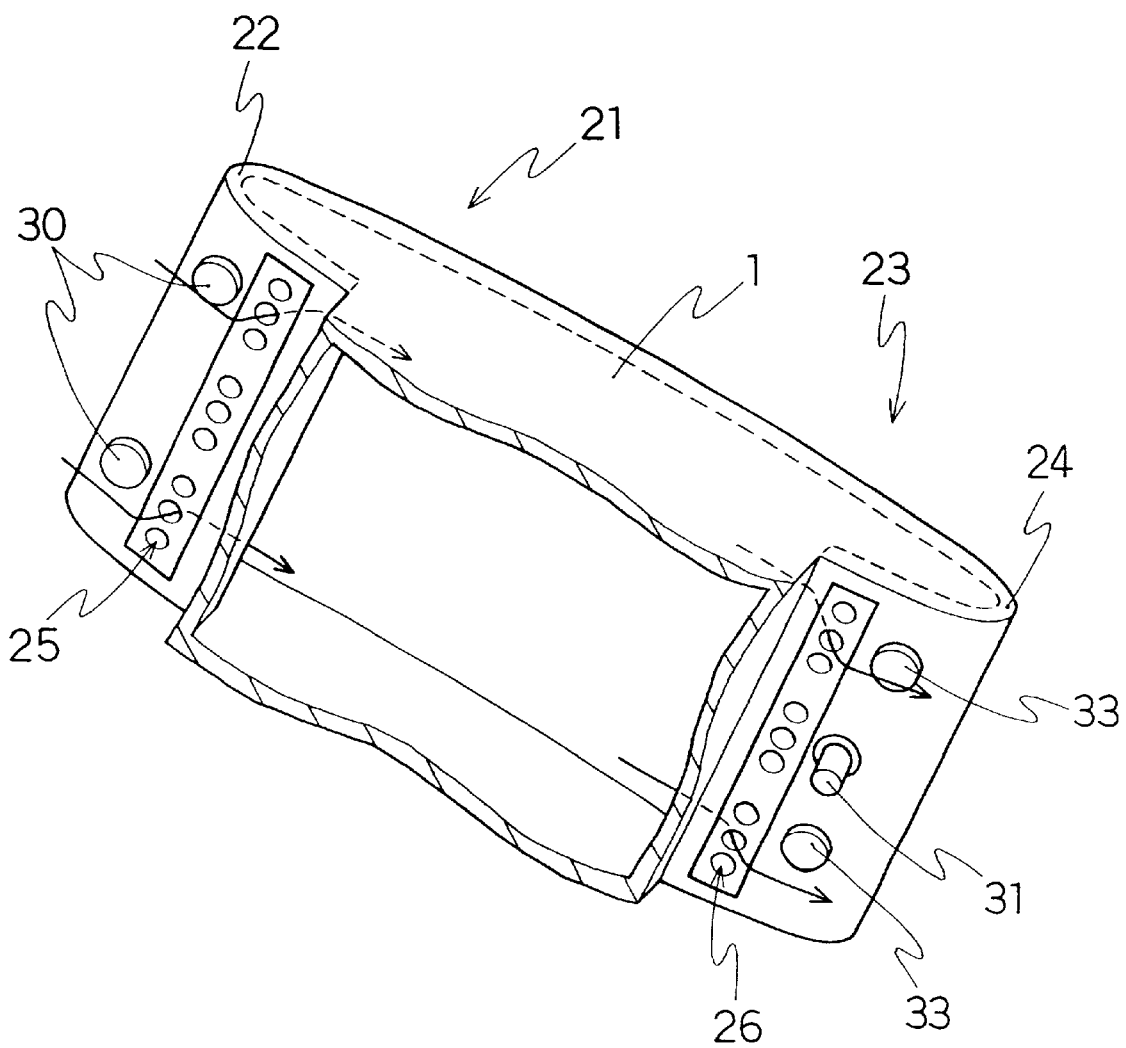
FIG. 2 is a partially developed perspective view showing an arrangement proximate to an air suction inlet of the automobile of FIG. 1.

In the illustrated embodiment, it is also possible to arrange a down-facing lamp 30 proximate to a tip end of the front visor 22 as an illuminating means, as illustrated in FIG. 2. By the arrangement of such a lamp 30, in case the engine needs to be inspected during nighttime, the interior of the engine room might be entirely illuminated by opening the bonnet 2 and switching the lamp 30 ON for making the inspection easy. Moreover, since it is not necessary for a person performing the inspection to hold an illuminating means such as a flashlight by hand, the person might use both hands for operation.

It is further preferable to arrange a down-facing television camera 31 proximate to a tip end of the rear visor 24 and to arrange, for instance, a television image receiver 32 as illustrated in FIG. 1 at a suitable position of a dashboard in the automobile as a display device for outputting image information which have been input to the television camera 31. It is also preferable that a down-facing lamp 33 is arranged also proximate to the tip end of the rear visor 24, similarly to the front visor 22.

In case an obstacle should be present immediately behind the rear end of the automobile, image information concerning such obstacle is input to the television camera 31 and are transmitted to the television image receiver 32 in the automobile via signal cables (not shown) disposed within the body such that they can be visually confirmed by the driver.

Therefore, by using the television image receiver 32 together with a conventionally used rear-view mirror or fender mirrors, it is possible to secure a large rear sight so that the automobile might be safely and reliably moved backwards. Moreover, by switching the lamp 33 ON, it is possible to secure rear sight by using the television camera 31 and the television image receiver 32 even during nighttime or even in the dark garage, so that the automobile might be safely and reliably moved backwards.

It should be noted that while the bonnet and the trunk as well as the front fenders and the rear fenders are arranged to assume substantially identical shapes from among the front portion and the rear portion of the body, the present invention is not limited to this, and it is also possible to arrange a curved sheet of glasses of the front windshield window and the rear windshield window at the front and rear portions to be of identical shapes. With this arrangement, it is possible to obtain an automobile of even more handsome external appearance and of high utility values.

Moreover, since a strength of the body can be improved in case the front and rear portions of the automobile are connected through welding, the automobile might assume a higher rigidity and an improved safety than compared to conventional automobiles even if the automobile should happen to collide or fall from a height.

INDUSTRIAL APPLICABILITY

According to the present invention, it is possible to achieve rationalization of manufacture as well as large-scaled restructuring and further to secure safety during driving and comfort in the automobile.

What is claimed is:

1. An automobile in which an external appearance of a body of the automobile is formed to assume substantially identically shaped front and rear portions, the front portion having a bonnet, front fenders, engine portion, front windshield and front doors, and the rear portion having a trunk, rear fenders, luggage containing portion, rear windshield and rear doors, and the front portion and the rear portion are connected through welding of substantially identically shaped front and rear portions, and in which a front visor extends to the front from a front head portion of a roof of the body and a rear visor extends to the rear from a rear head portion of the roof of the body.

2. The automobile of claim 1, wherein an air suction inlet with a filter for introducing external air into said automobile is formed at least at a part of the front visor, and wherein an exhaust outlet for discharging air within said automobile to the exterior is formed at least at a part of the rear visor.

3. The automobile of any one of claims 1 or 2, wherein the front visor has a tip end, and the automobile is provided with an illuminating means proximate to said tip end of the front visor.

4. The automobile of any one of claims 1 or 2, wherein the rear visor has a tip end, and the automobile is provided with a television camera proximate to said tip end of the rear visor and with a display device for outputting image information which has been input to the television camera provided at a suitable position of a dashboard in the automobile.

* * * * *